(12) United States Patent
Schmalz et al.

(10) Patent No.: US 10,944,741 B2
(45) Date of Patent: Mar. 9, 2021

(54) METHOD FOR READING AN IDENTITY DOCUMENT

(71) Applicant: GIESECKE & DEVRIENT GMBH, Munich (DE)

(72) Inventors: Frank Schmalz, Munich (DE); Jan Eichholz, Munich (DE); Christopher Schmid, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/325,382

(22) PCT Filed: Jul. 10, 2015

(86) PCT No.: PCT/EP2015/001436
§ 371 (c)(1),
(2) Date: Jan. 10, 2017

(87) PCT Pub. No.: WO2016/005060
PCT Pub. Date: Jan. 14, 2016

(65) Prior Publication Data
US 2017/0195309 A1    Jul. 6, 2017

(30) Foreign Application Priority Data
Jul. 11, 2014   (DE) ...................... 10 2014 010 339.0

(51) Int. Cl.
*H04L 29/06*     (2006.01)
*G06F 16/22*     (2019.01)
(Continued)

(52) U.S. Cl.
CPC ............ *H04L 63/083* (2013.01); *G06F 16/22* (2019.01); *G06F 21/6209* (2013.01);
(Continued)

(58) Field of Classification Search
CPC ........ G06F 21/32; G06F 21/72; G06F 21/445; G06F 21/34; G06F 21/35; G06F 21/6209;
(Continued)

(56) References Cited

U.S. PATENT DOCUMENTS 4,960,982 A * 10/1990 Takahira ............... G06Q 20/341
235/380
7,118,027 B2 * 10/2006 Sussman .............. G06Q 20/341
235/375
(Continued)

FOREIGN PATENT DOCUMENTS

DE   202007007418 U1   9/2007
DE   102012203313 A1   9/2013
(Continued)

OTHER PUBLICATIONS

IBM Research Report—Security and Privacy Issues in Machine Readable Travel Documents by Gaurav S. Kc (Columbia University) pp. 17, Apr. 1, 2005.*
(Continued)

*Primary Examiner* — Jeffrey C Pwu
*Assistant Examiner* — Ali H. Cheema
(74) *Attorney, Agent, or Firm* — Workman Nydegger

(57) ABSTRACT

A method for reading an identity document, a readout terminal and a readout system, which simplifies the multiple reading of identity documents. According to the method, an authentication key and an information item are stored in hidden fashion in the chip of the identity document.

13 Claims, 2 Drawing Sheets

(51) Int. Cl.
*G06F 21/62* (2013.01)
*G07F 7/08* (2006.01)

(52) U.S. Cl.
CPC .......... *G07F 7/0873* (2013.01); *G07F 7/0893* (2013.01); *H04L 63/06* (2013.01); *H04L 63/08* (2013.01)

(58) Field of Classification Search
CPC ........ G06F 21/602; G06F 21/64; G06F 17/30; G06F 17/30312; G06Q 10/087; G06Q 20/341; G06Q 20/3829; G06Q 20/388; G06Q 50/265; G06Q 20/353; G06Q 10/10; G06K 19/07749; G06K 19/10; G06K 9/00885; G06K 9/00906; G07C 9/00087; G07C 9/00079; G07C 9/22; G07C 9/257; G07C 9/00; G07C 9/27; H04L 9/0844; H04L 63/083; H04L 63/06; G07F 7/0893; G07F 19/202; G07F 7/08; G07F 7/0873; G07D 7/01
USPC ............. 340/5.6, 5.86, 5.52, 5.8, 5.2, 10.34; 235/380, 382, 375; 713/189, 169, 175, 713/157, 168, 176; 705/71; 348/61; 382/115, 118, 116; 726/9
See application file for complete search history.

(56) References Cited

U.S. PATENT DOCUMENTS

| | | | |
|---|---|---|---|
| 7,420,458 B1 * | 9/2008 | Kuzma | G06Q 10/087 340/10.34 |
| 7,837,119 B2 | 11/2010 | Graf et al. | |
| 2003/0159044 A1 * | 8/2003 | Doyle | G06F 21/64 713/176 |
| 2004/0233040 A1 * | 11/2004 | Lane | G07D 7/01 340/5.86 |
| 2004/0250066 A1 * | 12/2004 | Di Luoffo | G06Q 20/341 713/168 |
| 2007/0063055 A1 | 3/2007 | Graf et al. | |
| 2009/0138707 A1 * | 5/2009 | Sibert | G06Q 20/388 713/168 |
| 2009/0219136 A1 * | 9/2009 | Brunet | G06K 19/07749 340/5.86 |
| 2010/0180118 A1 * | 7/2010 | Nakatsugawa | G06F 21/72 713/169 |
| 2010/0223460 A1 * | 9/2010 | Blokzijl | G06Q 10/10 713/157 |
| 2010/0245034 A1 * | 9/2010 | D'Oliveiro | H04L 9/0844 340/5.6 |
| 2010/0289614 A1 * | 11/2010 | Rechner | G07C 9/00079 340/5.2 |
| 2011/0068894 A1 * | 3/2011 | Braun | G06F 21/34 340/5.8 |
| 2011/0138191 A1 * | 6/2011 | Bond | G06F 21/6209 713/189 |
| 2011/0283369 A1 * | 11/2011 | Green | G06K 19/10 726/30 |
| 2012/0075442 A1 * | 3/2012 | Vujic | G07C 9/00087 348/61 |
| 2012/0199653 A1 * | 8/2012 | Wenzel | G07C 9/27 235/382 |
| 2012/0200389 A1 * | 8/2012 | Solomon | G06Q 10/087 340/5.52 |
| 2013/0243266 A1 * | 9/2013 | Lazzouni | G06K 9/00885 382/115 |
| 2013/0254117 A1 * | 9/2013 | von Mueller | G06Q 20/3829 705/71 |
| 2013/0305059 A1 * | 11/2013 | Gormley | H04L 9/0866 713/189 |
| 2013/0311788 A1 * | 11/2013 | Faher | G06Q 50/265 713/189 |
| 2014/0081872 A1 * | 3/2014 | Papagrigoriou | G06Q 20/353 705/71 |
| 2014/0081874 A1 * | 3/2014 | Lewis | G07F 19/202 705/72 |
| 2014/0166745 A1 * | 6/2014 | Graef | G07F 19/202 235/379 |
| 2014/0294258 A1 * | 10/2014 | King | G06F 21/32 382/118 |
| 2014/0369570 A1 * | 12/2014 | Cheikh | G07C 9/22 382/116 |
| 2015/0086088 A1 * | 3/2015 | King | G06K 9/00906 382/118 |

FOREIGN PATENT DOCUMENTS

| | | | |
|---|---|---|---|
| EP | 0923040 A2 | 6/1999 | |
| EP | 1079338 A2 | 2/2001 | |
| ES | 2352519 T3 * | 2/2011 | ............... G07C 9/00 |
| WO | 2004090800 A2 | 10/2004 | |
| WO | 2005066910 A1 | 7/2005 | |
| WO | 2013153118 A1 | 10/2013 | |

OTHER PUBLICATIONS

German Search Report for corresponding German Application No. 102014010339.0, dated Aug. 24, 2015.
International Search Report for corresponding International PCT Application No. PCT/EP2015/001436, dated Sep. 22, 2015.

* cited by examiner

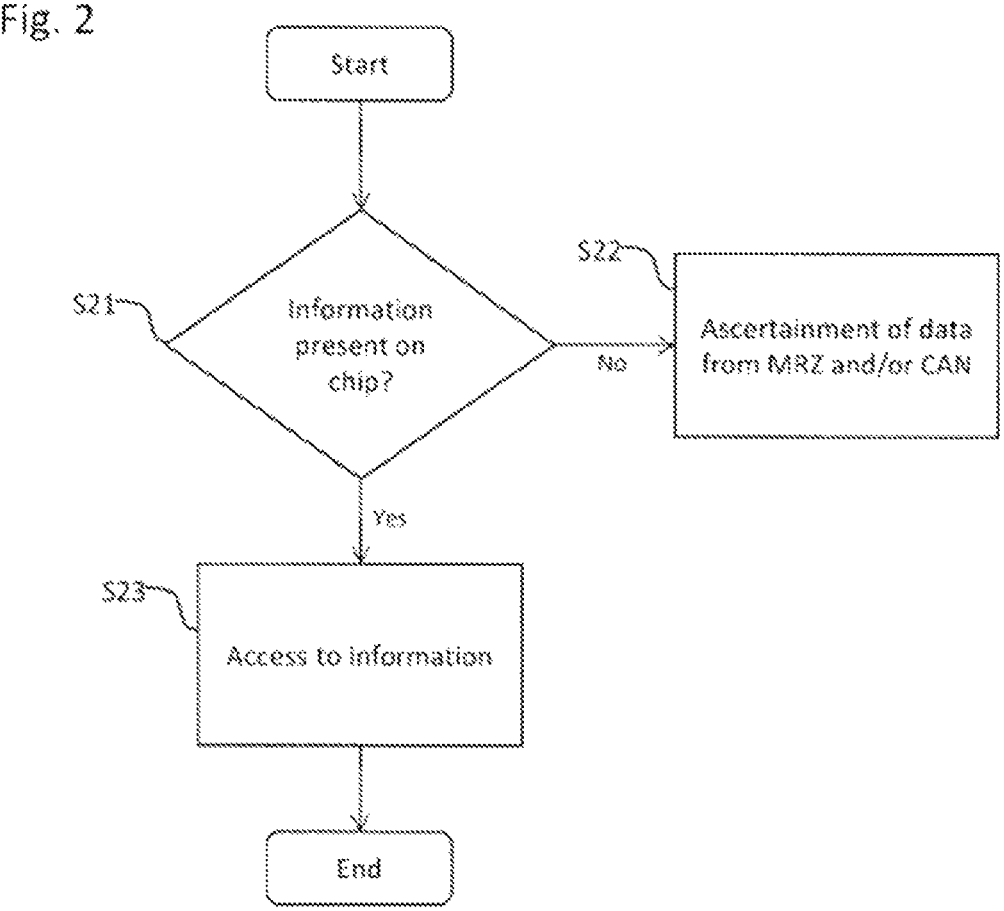
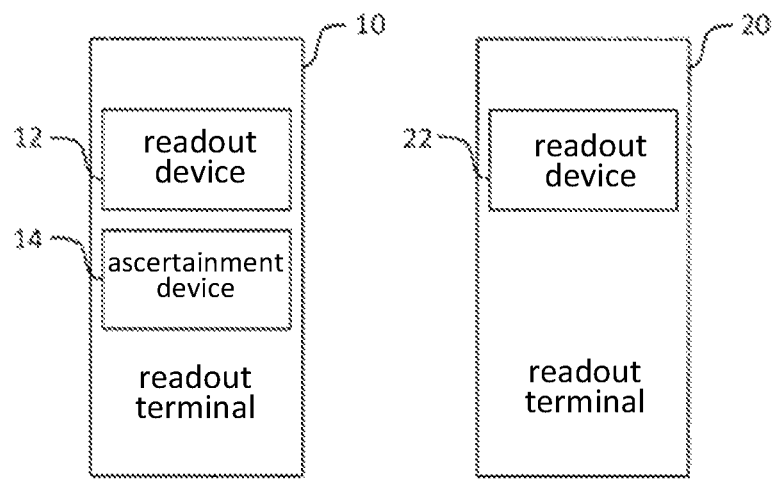

METHOD FOR READING AN IDENTITY DOCUMENT

TECHNICAL FIELD

The present invention relates to a method for reading an identity document, and a readout terminal. Readout terminals are used at seaports and/or airports to handle the passport control and in shops in the duty-free shopping area of a seaport and/or airport in order to read an identity document, such as a passport.

STATE OF THE ART

A large number of passports used today has a contactless interface (for example in accordance with ISO 14443), by means of which the data stored in the identity document can be accessed. In order to ensure that the identity document is not read without the consent of the holder (for example when the holder passes a readout terminal with the identity document in his pocket), it is required that an access to the data stored in the chip of the identity document in "contactlessly readable" fashion is possible only by making available an "access code". This access code can be the CAN (card access number) or data stored in optical fashion in the MRZ (machine readable zone), for example. To allow an access to this access code, the holder of the identity document must place said entity document on a reading device in a predetermined manner. Both the placing of the identity document in the correct orientation, the arrangement (the identity document must be partially opened and a specific page has to be on top) and the optical detection of the data in the CAN or the MRZ require time and are prone to errors. At airports and/or seaports large numbers of passengers are handled and therefore larger delays can occur. Further, it is troublesome when travelers who shop in the duty-free area of the port have to place their identity document on the reading device again accurately with every purchase, so that a reading of the MRZ and/or the CAN becomes possible.

WO 2004/090800 A2 discloses an apparatus and a method for reliably determining the deliberate use of a contactless data carrier, wherein the data carrier has an optically readable region in addition to a contactless interface. In the optically readable region data are stored which are required for reading the contactless data (for example a code).

STATEMENT OF THE INVENTION

The invention is based on the object of making available a method for reading an identity document and a readout terminal that solves the known problems of the prior art and is further suitable to speed up the secure and repeated provision of the data present in a chip of the identity document by means of an already once read identity document at authorized readout terminals.

The object is achieved by the subject matter of the independent claims. Preferred embodiments of the subject matter of the invention result from the dependent claims.

The invention is based on the idea to speed up the repeated reading of an identity document by making it possible to effect a repeated reading in a defined region (inside an airport, for example) without a repeated optical readout of the identity document. The process can be further sped up by storing these data in a database and storing a reference to the data in the data base in a preferably contactlessly readable chip of the identity document, wherein the reference to the data is stored in hidden fashion on the identity document.

Accordingly, a method for reading an identity document comprises ascertaining a code from the identity document necessary for establishing a secure connection to a first chip of the identity document, wherein an authentication key and an information item are stored in hidden fashion in the first chip and/or in a second chip of the identity document.

The code necessary for establishing a secure connection to the first chip of the identity document can be, for example, a bar code and/or data stored on the identity document in the MRZ (machine readable zone) or can be read by machine or it can be the CAN (card access number). It is possible to read the first chip of the identity document contactlessly exclusively by making use of these data. In this way it is prevented that the identity document is read without consent of the holder when said holder passes a readout terminal passes without presenting the identity document.

With the method of the invention it is possible particularly advantageously to speed up a repeated reading of an identity document, for example at an airport and/or at a seaport. For, after a first ascertainment of the code from the identity document necessary for establishing a secure connection to the first chip of the identity document, this information can be stored in the first and/or the second chip together with the authentication key. In comparison to known methods in which the holder of the identity document receives a further memory card or a bar code label on which the data of the identity document or the storage location in the database are stored, there is no need for an additional card or an additional label. These involve the risk of the user losing the card or being able to pass a passport control by merely showing the additional card without having his identity document on him. Further, the method of the invention has the advantage that "authorized" readout terminals, i.e. readout terminals possessing the authentication key, do not have to ascertain the code again. Since the ascertainment of the code is effected through the time-consuming and error-prone readout of the MRZ or the CAN, a lot of time can be saved in this manner. Due to the fact that the authentication key and the information are stored in "hidden" fashion in the first and/or second chip, it is possible to see whether the information is present on the chip after successful authentication vis-à-vis the chip (with the aid of the authentication key). A "tracing", i.e. a tracking of the traveler on the basis of the data stored in the chip of the identity document, is thus impossible with an unauthorized readout terminal. An unauthorized readout terminal does not possess the authentication key and hence cannot find out whether the information stored in encrypted fashion is present in the first or the second chip. The authentication key could also be referred to as an authentication key for ascertaining whether the information is present on the first and/or the second chip.

According to one embodiment, the authentication key cannot be read from the first and/or the second chip of the identity document. In this manner it is ensured advantageously that only authorized readout terminals are granted access to the data in the identity document. Thus the security of the personal data of the holder of the identity card remains safeguarded.

According to a further embodiment, the authentication key and/or the information cannot be read from the first chip and/or the second chip of the identity document without prior successful authentication with the authentication key.

This ensures that only such readout terminals are granted access to the identity document which know the authentication key.

Further, the information can comprise at least the code for establishing the secure connection to the first chip of the identity document. In this manner, the repeated reading of the identity document at authorized readout terminals (which know the authentication key) can be sped up substantially, since a repeated optical readout of the CAN and/or MRZ can be omitted.

According to a further embodiment, the method further comprises the reading of at least a portion of the data from the first chip of the identity document by employing the secure connection to the first chip and the storing of the data in a database, wherein the information includes at least the storage location of the data in the database. In this manner it is possible to significantly speed up the repeated reading of an identity document, such as required for example at airports or seaports, since the reading of an identity document with the aid of the MRZ and/or the CAN is required only once. Subsequently, it is merely required to read the information in which the storage location of the data in the database is stored after successful authentication with the authentication key, and the readout terminal can access the data of the first chip stored in the database. At the same time, the security of the read data is maintained.

According to one embodiment, the secure connection to the first chip is established employing the ascertained code and/or the secure connection to the first chip is established employing the information including the code. When the connection is established employing the information including the code, this means conversely that the CAN/MRZ has already been read. In this manner a secure connection to the chip can be established particularly efficiently.

The first and/or the second chip of the identity document is any desired memory element arranged on the identity document that can preferably be read in contactless fashion. In other words, the first and/or the second chip is integrated in the identity document. It is possible to execute the identity document with only a first chip.

To prevent the unauthorized reading of the reference to the data in the database, this is possible only for readout terminals that possess the authentication key.

The data stored in the database are stored in the database preferably in encrypted fashion. In this manner, it can be prevented advantageously that an unauthorized reading of data from the database leads to the receipt of the information stored on the chip of the identity document. Thus the security of the personal data remains guaranteed.

According to one embodiment, the readout terminal is granted a read access to the information only after authentication with the authentication key. It is thus ensured that only authorized readout terminals are granted access to the information. In this manner, the security of the data stored on the identity document data remains safeguarded. Only after successful authentication is it possible to recognize whether the information is actually stored in the identity document. Thus, a tracking is prevented with respect to unauthorized persons being able to check whether the information is stored in the chip.

The advantages of the invention are further shown in a readout terminal with an ascertaining means for ascertaining a code necessary for establishing a secure connection to a first chip of an identity document, wherein the ascertaining means ascertains the code from the identity document, and with a readout device for reading at least a portion of the data from the first chip of the identity document, wherein the readout terminal is configured to store an authentication key and an information item in hidden fashion in the first chip and/or in a second chip of the identity document.

In this manner, after a first reading of the identity document, the repeated reading of the identity document can be significantly sped up, since the time-consuming, repeated ascertaining of the code necessary for establishing a secure connection to the first chip of the identity document is omitted. Since the first and/or second chip of the identity document are preferably readable contactlessly, it is possible for authorized readout terminals to obtain the information stored in hidden fashion after successful authentication vis-à-vis the chip, without the elaborate ascertainment of the code. Readout errors as they can occur through incorrect positioning of the identity document in the ascertaining device are thus avoided advantageously.

According to one embodiment, the readout terminal is configured to store the data from the first chip of the identity document in a database and to store a storage location of the data in the database in the information. In this manner, the data stored in the database can be accessed advantageously upon the repeated reading of the identity document, since said data are stored in the information. A time-consuming and error-prone reading of the CAN and/or MRZ can be avoided when readout terminals are employed which know the authentication key.

According to one embodiment, the readout terminal and/or a further, authorized readout terminal is configured to access the data in the database employing the storage location stored in the information. In this way, the allocation between the data stored in the database and the information is facilitated substantially. Thus, the repeated reading of the identity document can be sped up substantially, since the time-consuming and frequently error-prone ascertainment of the code can be omitted. Accordingly, at locations where a repeated reading of the identity document is required, the reading process can be sped up advantageously.

Further, the readout terminal can be configured to store the code for establishing the secure connection to the first chip of the identity document in the information. In this manner, readout terminals which know the authentication key are enabled to access the first chip, wherein a readout of the CAN and/or MRZ can be avoided. In this manner, the necessary readout time is reduced substantially.

According to one embodiment, at least one first readout terminal can be used in connection with a second readout terminal in a readout system, wherein the second readout terminal, which knows the authentication key, is configured to read the information from the identity document. It is thus possible, after the information has been stored in the first and/or second chip, to obtain a rapid access to the data in the identity document. In other words, after the identity document has been read once and the code necessary for establishing the secure connection to the first chip has been stored in the information in encrypted fashion, it is not necessary to again ascertain the code necessary for establishing the secure connection to the first chip of the identity document. The repeated reading of the MRZ and/or the CAN is thus omitted, whereby a lot of time can be saved upon repeated reading.

BRIEF DESCRIPTION OF THE DRAWINGS

FIG. 2 shows the sequence upon repeated reading of an identity document; and

FIG. 3 shows a readout system according to the invention.

DETAILED DESCRIPTION OF PREFERRED EMBODIMENTS OF THE INVENTION

Figure 1:
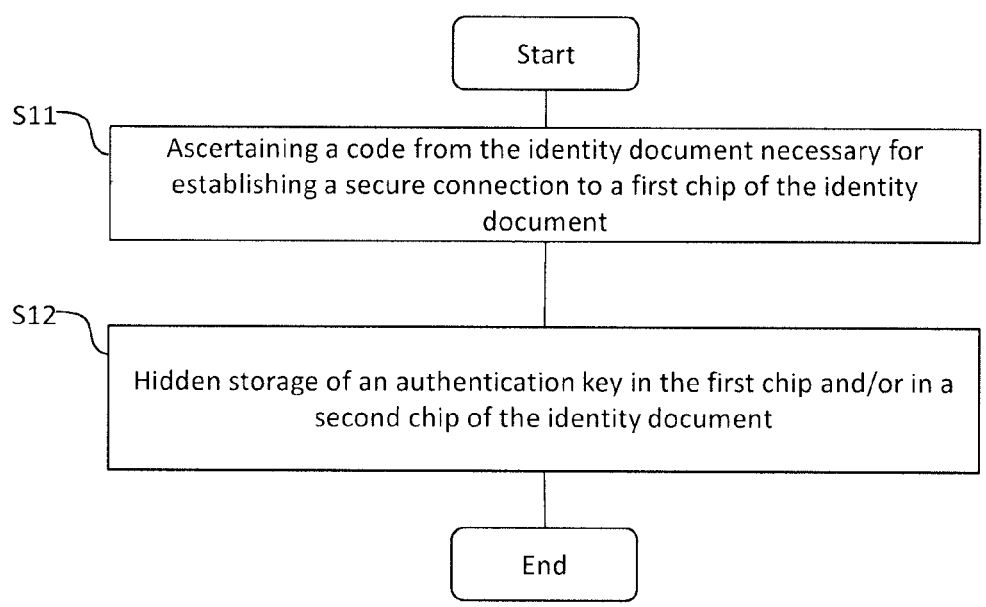
FIG. 1 shows the sequence of a method according to the invention by means of a flow chart.

In the following, the invention is described with reference to the FIGS. 1-3 by means of purely exemplary embodiments.

FIG. 1 shows the sequence of a method according to the invention. In step S11, first a code necessary for establishing a secure connection to a first chip of the identity document is ascertained from the identity document.

An identity document within the meaning of the invention can be a passport, a national identity card and/or a different type of identity card, such as for example an employee ID card, which is employed to allow an employee to access a company. Passports and identity cards can be executed according to the ICAO standard (DOC 9303). Identity documents in accordance with the ICAO standard are configured to be read in contactless fashion by means of a contactless interface. To prevent an unauthorized and undesired readout via the contactless interface, it is necessary in accordance with the ICAO standard that the input of a CAN (card access number) and/or the reading of a machine readable zone (MRZ; machine readable zone) is effected before the readout. From the CAN and/or the MRZ a code or a key is generated, which is necessary to read the data from the first chip of the identity document. The readout of the data can be effected by means of the BAC and/or the PACE protocol according to the ICAO standard (DOC 9303) by optical readout of the MRZ and/or the CAN or by manual input. The chip can be an MRTD chip.

After generating the code, in a next step S12 an information item is stored which can include the code for establishing the secure connection to the first chip, and an authentication key is stored in the first chip of the identity document. With the aid of the authentication key, the information is so stored in hidden fashion on the first chip that it can be read only after successful authentication (by means of the authentication key) of a readout terminal vis-à-vis the first chip. Alternatively, the authentication key and the information can be stored in analogous fashion in a second chip of the identity document. Said second chip can be integrated in the identity document. By providing the second chip a clear separation is made possible between the first chip containing personal data and the second chip.

The authentication key is preferably made available only to a limited number of readout terminals. For example, the limited number can refer to a closed system of readout terminals in an airport and/or a seaport. In this manner, the reading of the already once read identity document can be sped up substantially within such a port, wherein at the same time the security of the personal data is maintained, since the first key is made available only to authorized readout terminals.

The first chip of the identity document can be any type of device which is suitable for storing data. Preferably non-volatile, once or multiply writable memory components are used for the chip.

In a next step, a secure connection can be established to the first chip of the identity document with the aid of the information (if the identity document has been read already once) or the CAN and/or the MRZ data, and the data stored there can be read.

Said read data can be stored in a database in an optional, next step. The database is preferably executed such that access to it is possible only by authorized devices within the airport. The communication with the database is preferably effected via a secure, wired and/or wireless network connection. Alternative forms of access to the database are likewise possible.

Alternatively, the read data can be stored in the information. They are stored securely and non-traceably there, since their existence can be determined only after successful authentication vis-à-vis the identity document with the authentication key.

In this manner it is ensured that, for accessing the data of the identity document again, it is no longer is necessary to first optically read the MRZ and/or the CAN of the identity document, but that after successful authentication with the authentication key an access to the stored information is sufficient to access the data of the first chip of the identity document stored in the database and/or in the first or second chip (see FIG. 2). In this manner a repeated reading of the identity document, as can be required for example in multi-stage passport control stations, can be further sped up.

In comparison to a method in which a further memory card with the data of the identity document is issued in addition to the identity document, it can be ensured that, upon the repeated readout of the identity document, the holder still possesses the identity document and does not only possess the additionally issued memory card, since the first and/or second chip are firmly integrated in the identity document. Security is substantially increased thereby. In comparison to bar code stickers additionally applied to the identity document, security is also increased, since these stickers can be easily damaged and/or can be replaced wrongfully by stickers of other identity documents.

Upon storing the storage location of the data, merely a pointer to the data stored in the database is stored in the information on the first chip and/or on the second chip of the identity document according to a known indirect referencing method. The pointer or the storage location of the data can be designated in accordance with the serial number of the first chip and/or in accordance with the serial number of the second chip of the identity document. In this manner, a unique allocation is ensured between the chip and the database.

In order to further increase the security of the data in the database, the storing of the data in the database can be effected in encrypted fashion and in addition, a further key required for reading from the database can be stored in the first chip and/or in the second chip. According to one embodiment, the key can have a temporally limited validity period only.

Further, it is possible to store on the first chip and/or on the second chip of the identity document not only one authentication key of an airport and/or ferry port, but the authentication keys of a multiplicity of such ports. The authentication keys preferably have a temporally limited validity. Alternatively, the authentication keys are valid without temporal limitation.

FIG. 2 shows the sequence when a holder of an identity document arrives once again at an authorized readout terminal 10, 20 of a port to have his identity document read there. The readout terminal 10, 20 first checks in a first step S21, whether the information is stored in hidden fashion on the first and/or second chip. For this purpose the readout terminal 10, 20 initiates an authentication vis-à-vis the identity document employing the authentication key.

If the authentication fails, this means that on the identity document no "information" is stored and the identity card holder is requested in step S22 to so place his identity document on the readout terminal that the MRZ and/or CAN can be read to ascertain the code necessary for establishing a secure connection to the first chip of the identity document. The ascertainment is effected in accordance with the flowchart described in FIG. 1. Upon this ascertainment, also an authentication is effected, employing the CAN/MRZ data, however a different authentication key is employed in this authentication.

If the data have already been detected and the authentication is successful, then in a next step S23, the access to the information is effected. It is required for the access of an authorized readout terminal to the information that the readout terminal possesses the authentication key. In step S23, the ascertainment of the code necessary for establishing a secure connection to the first chip of the identity document from the MRZ and/or CAN is omitted. As a result, a lot of time can be saved upon reading the identity document, since it is not necessary to place the identity document on the readout terminal in a defined position. In the same course this reduces the error rate of the readout procedure.

The authentication key can be a key that is valid for a limited period of time only. In this manner it is ensured that even authorized readout terminals are granted access to the information only for a limited period of time, for example four hours, two days and/or two weeks.

FIG. 3 shows a readout system 100 according to the invention with a first readout terminal 10 and a second readout terminal 20. In the shown embodiment, the first readout terminal 10 has a readout device 12 and an ascertainment device 14. The readout terminal 20 has only a readout device 22. With the readout terminal 20, it is possible, after the data have already been detected using the ascertainment device 14 of the readout terminal 10, to access the information stored in hidden fashion merely by means of the readout device 22, i.e. without the requirement of the ascertaining means. According to an alternative, the readout terminal 20 can be equipped additionally with an ascertaining device of its own (not shown), with which, if the data have not yet been stored in the database (see FIG. 1), the data can be stored in the database.

A further readout terminal can be provided in the exit area of the airport, for example, with which it is possible to delete the information stored in the first and/or second chip and the authentication key. For this purpose, the identity document is placed on this readout terminal and subsequently the data are deleted from the chip and from the database, where applicable. Thereby the privacy of the traveler is protected additionally.

The invention claimed is:

1. A method for efficiently reading an identity document within a readout system by both a first terminal and a second terminal of the readout system, the first terminal being separate from the second terminal, the first terminal including a readout device and an ascertaining device, and the second terminal including at least a readout device, the method comprising the following steps of:
    ascertaining a code from the identity document necessary for establishing a secure connection to a first chip of the identity document, wherein the ascertaining of the code is effected by the ascertainment device of the first terminal optically detecting the code from the identity document;
    providing, by the first terminal to the identity document, an authentication key to enable authentication with the identity document, where authentication is necessary to effect access by the first terminal and the second terminal to an information item stored on the identity document;
    storing said authentication key and the information item in the first chip and/or in a second chip of the identity document, the authentication key and the information item being stored in the first chip and/or in the second chip in hidden fashion; and
    establishing a second secure connection to the first chip of the identity document by the readout device of the second terminal based on the authentication key without an ascertaining of the code by the second terminal, wherein the authentication key cannot be read from the first chip and/or the second chip of the identity document by an unauthorized terminal, and
    wherein the first terminal or the second terminal is granted a read access to the information item after authentication with the authentication key.

2. The method according to claim 1, further including the following steps of:
    reading at least a portion of data from the first chip of the identity document employing the secure connection to the first chip,
    storing the data in a database, wherein the information item includes at least a storage location of the data in the database.

3. The method according to claim 2, wherein in the information item the storage location of the data in the database is designated in accordance with a serial number of the first chip and/or of the second chip.

4. The method according to claim 1, wherein the secure connection to the first chip is established employing the ascertained code and/or that the secure connection to the first chip is established employing the information item including the code.

5. The method according to claim 4, wherein in the information a storage location of data in a database is designated in accordance with a serial number of the first chip and/or of the second chip.

6. The method according to claim 1, wherein the ascertainment of the code is effected by receiving manual input of the code in the first terminal or the second terminal.

7. The method according to claim 1, wherein the code is a code that is attached to the identity document in an optically detectable fashion including a card access number (CAN) or a machine-readable zone password (MRZ).

8. The method according to claim 1, wherein the authentication key is valid for a limited period of time.

9. The method according to claim 1, wherein the information item includes at least the code for establishing the secure connection to the first chip of the identity document.

10. A terminal including:
    an ascertainment device for ascertaining a code from an identity document necessary for establishing a secure connection to a first chip of the identity document, wherein the ascertainment device is configured to ascertain the code by the ascertainment device of the terminal optically detecting the code from the identity document;
    a readout device configured to read at least a portion of the data from the first chip of the identity document,
    wherein
    the terminal is configured to provide an authentication key to the identity document to enable authentication with the identity document, where authentication is necessary to effect access by the terminal and a second terminal to an information item stored on the identity document,
    the terminal is configured to initiate authentication with the identity document, and
    the terminal is configured to store the authentication key and the information item in hidden fashion in the first chip and/or in a second chip of the identity document such that the second terminal may subsequently establish a second secure connection to the first chip of the identity based on the authentication key without an ascertaining of the code by the second terminal, the second terminal being separate from said terminal, wherein the authentication key cannot be read from the first chip and/or the second chip of the identity document by an unauthorized terminal, and wherein the terminal or the second terminal is granted a read access to the information item after authentication with the authentication key.

11. The terminal according to claim 10, wherein the terminal is configured to store data from the first chip of the identity document in a database and that the terminal is configured to store a storage location of the data in the database in the information item.

12. The terminal according to claim 10, wherein the terminal is configured to store the code for establishing the secure connection to the first chip of an identity document in the information item.

13. A readout system for reading an identity document, the system comprising:
 a first terminal; and
 a second terminal that is separate from the first terminal,
 wherein the first terminal includes
  an ascertainment device that ascertains a code from the identity document necessary for establishing a secure connection to a first chip of the identity document, wherein the ascertainment device is configured to ascertain the code by the ascertainment device of the first terminal optically detecting the code from the identity document;
  a readout device configured to read at least a portion of the data from the first chip of the identity document,
 wherein
  the first terminal is configured to provide an authentication key to the identity document to enable authentication with the identity document, where authentication is necessary to effect access by the first terminal and the second terminal to an information item stored on the identity document,
  the first terminal is configured to initiate authentication with the identity document, and
  the first terminal is configured to store the authentication key and the information item in hidden fashion in the first chip and/or in a second chip of the identity document, and
 wherein the second terminal is configured to establish a second secure connection to the first chip of the identity document and read the information from the identity document based on the authentication key without an ascertaining of the code by the second terminal,
  wherein the authentication key cannot be read from the first chip and/or the second chip of the identity document by an unauthorized terminal, and
  wherein the first terminal or the second terminal is granted a read access to the information item after authentication with the authentication key.

* * * * *